United States Patent
Stambera

[11] 3,797,633
[45] Mar. 19, 1974

[54] WEIGHING APPARATUS

[75] Inventor: Adolf Stambera, Stuttgart, Germany

[73] Assignee: Fr. Hesser Maschinenfabrik AG, Stuttgart-Bad Cannstatt, Germany

[22] Filed: Dec. 13, 1971

[21] Appl. No.: 207,331

[30] Foreign Application Priority Data
Dec. 9, 1970  Germany............................ 2060490

[52] U.S. Cl. .................................................. 198/39
[51] Int. Cl............................................. B65g 69/00
[58] Field of Search......................... 198/39; 141/115

[56] References Cited
UNITED STATES PATENTS
1,922,883   8/1933   Crago ................................... 198/39
2,867,246   1/1959   Busse .................................. 141/115
3,494,507   2/1970   Ricciardi............................... 198/39
2,662,665   12/1953  Harper.................................. 198/39

Primary Examiner—Richard E. Aegerter
Assistant Examiner—Joseph E. Valenza

[57] ABSTRACT

A weighing apparatus for relatively bulky food, or the like, in which the material is conveyed in excess of a unit quantity to a dual conveyor system carried by a scale, the material is weighed and the electronically controlled conveyors discharge the desired quantity of the material into a collecting hopper.

4 Claims, 3 Drawing Figures

WEIGHING APPARATUS

The invention relates generally to a weighing apparatus for use in conjunction with automatic packaging systems, and more particularly, for weighing predetermined quantities of piece goods, such as biscuits or the like.

In the prior art, weighing devices of this type are already known, e.g., see German DAS 1,549,191, in which a weighing receptacle is associated with a scale and the latter controls a metering device in conjunction with a calculator. A conveyor is associated with the weighing receptacle, with its operation controlled by the calculating machine, so as to remore the bulk material already weighed from the weighing receptacle and place it into a collecting receptacle. The device also has a provision for a coarse and a fine conveyor belt for discharging the bulk material, so that most of the material in the weighing receptacle can be rapidly conveyed out of it. This weighing device, however, is not suitable in this form for weighing out products like biscuits, candies, or the like which are in relatively large form, since in this application, as in other weighing systems, difficulties arise in separating the individual pieces when a predetermined quantity has to be weighed.

It is therefore the primary object of the present invention to provide a weighing apparatus which is adapted to specifically weigh predetermined quantities of relatively large piece goods such as candy or biscuits and to obviate difficulties encountered in the past in accurately weighting such goods.

In order to solve the problem of weighing products of the type described above, it is proposed, in accordance with the present invention, to provide a weighing device in which a quantity of the goods having a weight in excess of the predetermined weight is placed in a weighing receptacle, connected to a scale, in which the receptacle comprises two conveyor belts arranged at right angles to and vertically above each other.

A more specific aspect of the present invention resides in that the upper conveyor belt terminates above the lower belt so that any material conveyed on the upper belt falls onto the lower belt. This effects that the material on the upper belt is initially detoured in its path from the weighing receptacle onto the lower belt. However, when the goods pass from the one belt to the other, the individual pieces become separated from each other as desired, thus improving the accuracy of the weighing operation.

Another aspect of the present invention provides a weighing device in which the upper conveyor belt has an overflow edge extending, essentially, in the direction of conveyor travel. This ensures that the goods on the upper belt do not exceed, or exceed only slightly, an optimum height which allows the pieces to fall individually, while the edge provides ample storage capacity on the belt to sustain a regulated discharge flow. Any of the goods passing over the overflow edge to the lower conveyor belt may then be removed from the weighing receptacle as quickly as desired.

For a better understanding of the present invention, together with other and further objects thereof, reference is had to the following description taken in connection with the accompanying drawings, and its scope will be pointed out in the appended claims.

Figure 2:
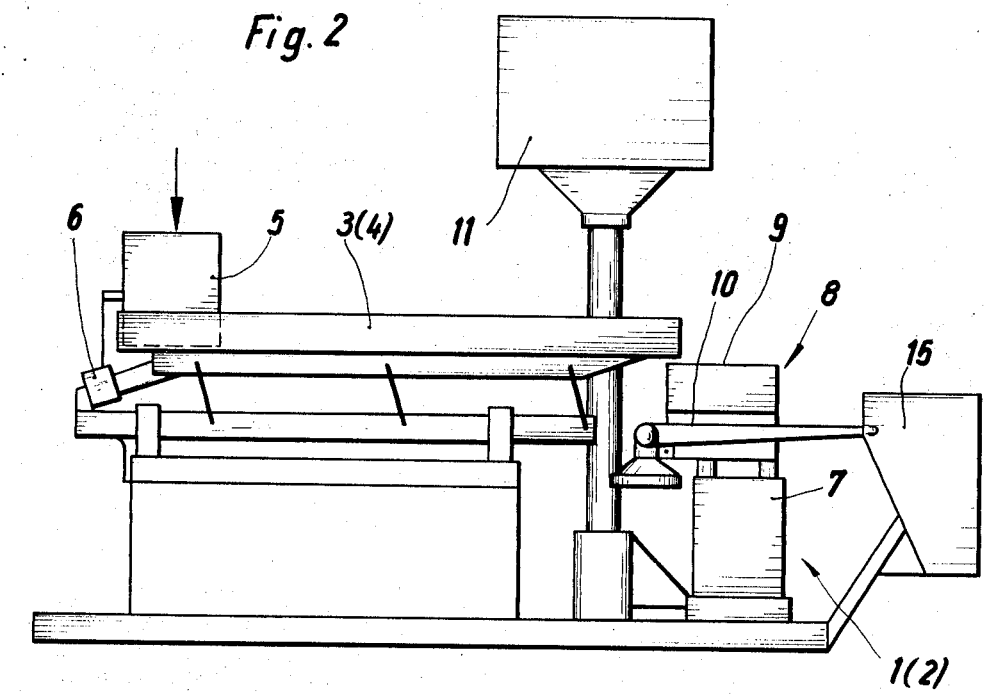
FIG. 2 is a side elevational view of the device shown in FIG. 1.
Figure 1:
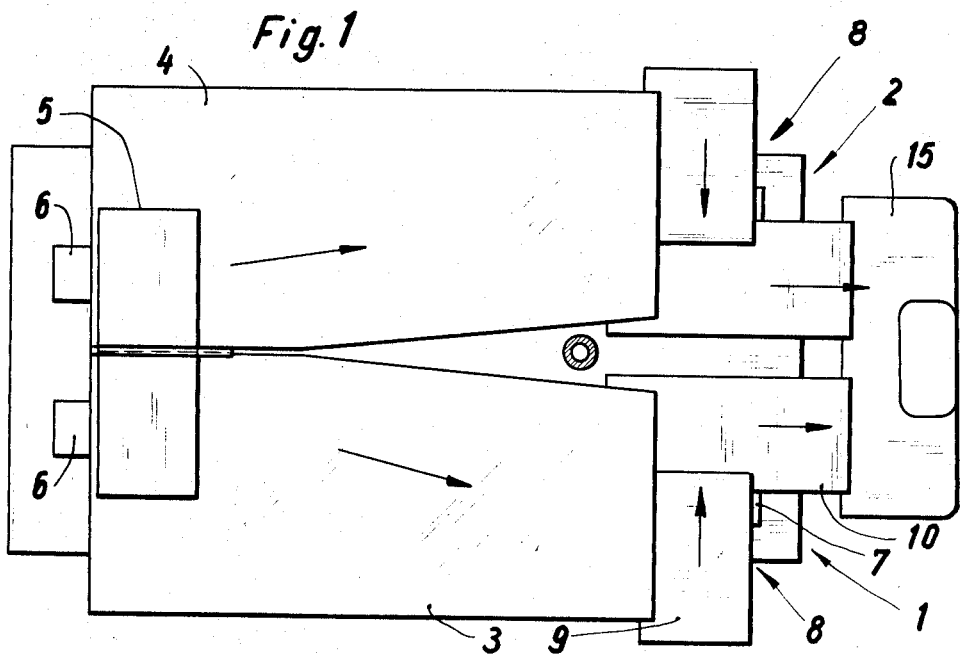
FIG. 1 is a plan view of the weighing device according to the invention.
Figure 3:
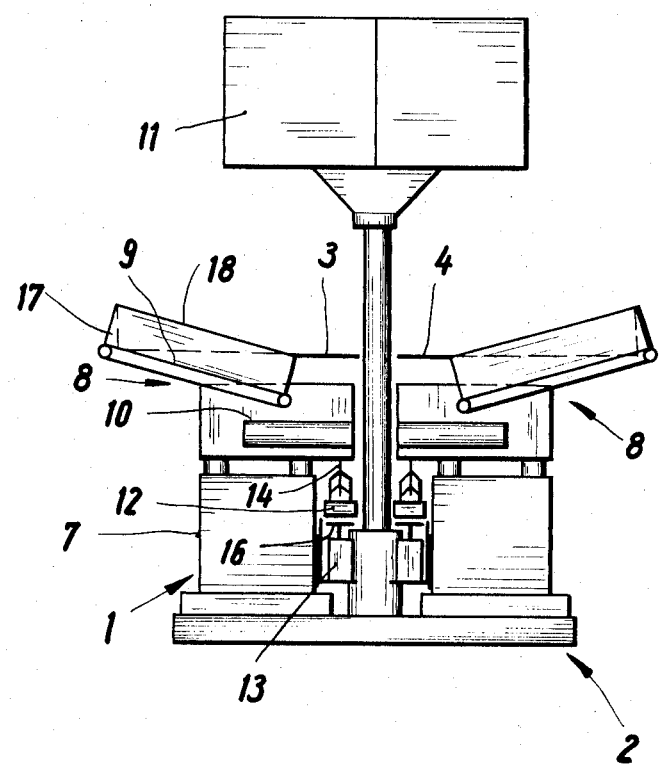
FIG. 3 is a front elevational view of the devices shown in FIGS. 1 and 2.

Referring now specifically to the drawings, there is shown two weighing devices 1,2 arranged side-by-side in a mirror image, and are adapted to receive the goods to be weighed from a common storage receptacle 5 by means of feed channels 3,4 which are also arranged in a mirror image. Each of the feed channels has its own drive 6 such as, for example, an electromagnetic drive.

Each of the two weighing devices operate in the same manner; therefore, for simplicity of description, only one will hereafter be described in detail.

The weighing device 1 comprises a scale 7, of a type known per se, carrying a weighing receptacle 8 which includes two conveyor belts 9, 10 arranged at right angles to and vertically above each other. The movement of the conveyor belts 9, 10 is controlled by the scale 7 through the operation of a conventional electronic weight control unit 11. The device also includes a loading weight 12 which can be raised and lowered in a controlled manner by means of a lifting device 13, in such a manner that it may be suspended from a hook 14 of the weighing receptacle 8 and may thus be used to load scale 7.

The conveyor belts 9,10 are driven by motors, not shown. The upper belt 9 preferably terminates at an end above the lower belt 10 in such a manner that the goods leaving the upper belt fall onto the lower belt. The latter belt terminates above a collecting hopper 15 which serves to fill the weighed material into packaging containers, not shown.

The piece goods are weighed out as follows. The loading weight 12 is raised and feed channel 3 is switched on to bring material from storage receptacle 5 to both conveyor bels 9,10. The feed channel 3 is switched off as soon as scale 7 indicates on control unit 11 a load greater than a predetermined nominal weight on the belts. After feed channel 3 has been switched off, the last reading on scale 7 is stored in control unit 11. A table 16 in lifting device 13 is then lowered, so that loading weight 12 descends onto hook 14 and loads scale 7. The loading weight 12 is exactly the same weight as the predetermined unit weight of material to be weighed. With scale 7 additionally loaded in this manner, conveyor belts 9,10 are switched on and the material thereon begins to pass to collecting hopper 15. This reduces the total load on scale 7 and this reduced weight is signalled to control unit 11. This value, which decreases more or less rapidly, is constantly compared with the value stored in control unit 11 immediately before weight 12 was hooked up. As soon as the two values are the same, conveyor belts 9,10 are stopped and the weighing of one lot or unit is thus completed.

As soon as loading weight 12 is raised, weighing receptacle 8 is ready to accept a new lot of material to be weighed.

As a result of the relative positioning of conveyor belts 9,10, as described above, the flow stream of material when conveyor belts 9,10 are switched on for the first phase is relatively powerful and coarse, whereas when the belts are switched on for the second phase, the flow of the material out of weighing receptacle 8 is a very fine stream which improves the accuracy of the weighing operation. If necessary, the relationship between these coarse and fine (trickle) flow streams may also be adjusted in known fashion by changing the speeds at which the material is conveyed.

Uniformity of the coarse and fine flow streams, in accordance with the properties of the material being weighed, may be obtained by imparting, at least to the upper conveyor belt, an upward or a downward slope. The overlap between the two belts may also be adjusted for the same purpose.

Another possible arrangement of the two conveyor belts is to tilt the upper conveyor belt 9 at right angles to its direction of travel, and to arrange along the lower side of the inclined plane of the belt a guide wall 17, which preferably is adjustable in height. The material arriving from feed channel 3 and falling onto upper belt 9 forms a storage layer of the desired thickness and any excess material falling over overflow edge 18 of wall 17 falls onto lower conveyor belt 10. From belt 10 the overflow material travels over a short path during the weighing operation, and therefore quickly, to collecting hopper 15. In this tilted arrangement, the lower belt 10 may be relatively wide and short, while the upper belt may be relatively long, so that it can shake material off laterally onto the lower belt. Thus, even if lower belt 10 travels relatively slowly, the material thereon can be quickly carried away. Although this arrangement has very high output capacity, it may be used, however, with advantage only if an adequately fine and uniform fine-flow stream can be produced even when the material is not detoured over lower conveyor belt 10.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Weighing apparatus for weighing discrete amounts of bulky particulate materials, in which such materials are conveyed to a receptacle in a quantity exceeding the predetermined unit weight, are weighed by a scale and thereafter the desired predetermined quantity is discharged from the receptacle controlled by the scale into a receiving unit, comprising:

a material feed channel;

a weighing receptacle placed for receiving said materials to be weighed, said receptacle being formed of a dual conveyor belt system with one conveyor spaced vertically above and at right angle to the other conveyor for discharging said materials from the upper onto the lower conveyor, said upper conveyor belt also being disposed at right angle to the direction of travel of the material in said feed channel; whereby the particulates are separated by movement and fall from one conveyor to the other;

a scale placed below said weighing receptacle and carrying the latter to weigh any material on the receptacle as a single unit;

and electronic control means operatively associated with said scale and said weighing receptacle including means effective to halt the movement of the conveyor belts when said conveyor belts have discharged said predetermined quantity into the receiving unit.

2. A weighing apparatus according to claim 1, in which at least the upper conveyor is inclined in the direction of the conveyor travel.

3. A weighing apparatus according to claim 1, and loading weight means for placing an additional weight upon said scale corresponding to the desired weight.

4. A weighing apparatus according to claim 1, wherein the direction of travel of the upper belt is substantially perpendicular to the direction of travel of the lower belt.

* * * * *